Feb. 24, 1970     F. A. WILLIAMS     3,497,861
PHOTOGRAPHIC-ILLUMINATION-UNIT SOCKET WITH
RETRACTILE ELECTRICAL CONTACTS
Filed May 22, 1967     2 Sheets-Sheet 1

FRANCIS A. WILLIAMS
INVENTOR.

BY
ATTORNEYS

Feb. 24, 1970 — F. A. WILLIAMS — 3,497,861
PHOTOGRAPHIC-ILLUMINATION-UNIT SOCKET WITH RETRACTILE ELECTRICAL CONTACTS
Filed May 22, 1967 — 2 Sheets-Sheet 2

FRANCIS A. WILLIAMS
INVENTOR.
BY Ronald S. Kanelos
Robert W. Hampton
ATTORNEYS

United States Patent Office 3,497,861
Patented Feb. 24, 1970

3,497,861
PHOTOGRAPHIC-ILLUMINATION-UNIT SOCKET
WITH RETRACTILE ELECTRICAL CONTACTS
Francis A. Williams, Webster, N.Y., assignor to Eastman Kodak Company, Rochester, N.Y., a corporation of New Jersey
Filed May 22, 1967, Ser. No. 640,208
Int. Cl. H01r 13/44
U.S. Cl. 339—42                                                   5 Claims

ABSTRACT OF THE DISCLOSURE

A socket adapted to receive a photographic illumination unit, particularly a multilamp flash unit, is provided with electrical contact members of which at least one is (1) moved into a position of engagement with a contact element of an illumination unit as the unit is inserted in the socket and (2) retracted from such position of engagement when the unit is removed from the socket.

BACKGROUND OF THE INVENTION

Field of the invention

The present invention relates to socket means adapted to receive photographic illumination units, and particularly to a socket structure incorporated in a camera to support operatively a multilamp flash unit of the type commonly referred to as a "flashcube."

Description of the prior art

It is well known to provide a camera with a socket structure adapted to receive the base portion of a flashcube or other multilamp flash unit to support rotatably the unit on the housing of the camera. A typical socket structure of this type is shown in commonly assigned U.S. Patent 3,353,468, entitled "Photographic Still Cameras With Built-in Flash," issued Nov. 21, 1967 in the name of David E. Beach. Such a socket includes a rotatable member provided with a central opening adapted to receive and engage releasably the central stud portion at the base of a flashcube, so that the supported flashcube is rotatable with the rotatable socket member to bring successive flashcube lamps into position for illumination of the scene with which the camera is aligned. A tubular collar extending downwardly from the base portion of the flashcube is in concentric relation to its central stud member and provides support for the contact wires of the flashcube lamps, such wires being spaced around the collar with portions thereof in generally parallel relation to the axis of the flashcube. When the flashcube is inserted in the socket, the collar is received in a corresponding annular opening that surrounds the rotatable socket member, and the two wires connected with whichever lamp is positioned for illumination of the scene to be photographed are engaged by corresponding electrical contact members associated with a lamp-firing circuit in the camera. A ring-like member may also be located within the annular opening to eject the flash unit from the socket, for example, by means of an ejector-button mechanism adapted to raise the ring member to dislodge the flashcube from engagement with resilient retention means by which the stud portion of the flashcube is releasably retained within the rotatable socket member.

In previously known socket constructions of the type described above, it has proven advantageous to locate the electrical contact members laterally of the flashcube collar member, rather than below that member, so that the resilient force exerted on the collar by the contact members does not tend to eject the member from the socket and so that the contact members will not interfere with the movement of the ejecting ring. Accordingly, as shown in the above-identified patent such contact members can be positioned to extend into the annular opening at one side thereof beyond the path of movement of the ejector ring. In such a socket arrangement, the contact members are resiliently supported and are displaced outwardly by the contact wires of the flashcube as it is installed in the socket. However, the inwardly directed force with which the contact members are maintained in resilient engagement with the contact wires must be relatively weak in order to prevent possible damage to the wires or the contact members and to enable the flashcube to be inserted easily into the socket. Additionally, since the contact members extend at least partially into the annular opening at all times, the ring-like member must be recessed or chamfered to clear the contact members if the ring-like member is movable upwardly beyond the contact members.

SUMMARY OF THE INVENTION

According to the present invention, a socket adapted to receive a photographic illumination unit is provided with electrical contact members of which at least one is (1) moved into a position of engagement with a contact element of an illumination unit as the unit is inserted in the socket and (2) retracted from such position of engagement when the unit is removed from the socket. According to the preferred embodiment described below, in which the photographic illumination unit is a multilamp flash unit of the "flashcube" type, as described in the above-identified patent, two movable contact members are located in lateral relation to the collar member of an inserted flashcube and laterally engage two of the contact wires thereon. Rather than being displaced directly by the contact wires, however, both contact members are movable away from the collar by cam means operatively engaged by a ring-like member, which is depressed by the flashcube collar when a flashcube is inserted in the socket and raised when the flashcube is removed. Thus, when the ring member is in its raised position, the contact members are withdrawn from the annular opening, which is closed by the ring member to provide an attractive socket appearance and to prevent foreign material from entering the socket through the annular opening. As the ring is displaced downwardly by the flashcube collar, the contacts are moved inwardly into lateral engagement with the corresponding contact wires by relatively strong resilient means, ensuring positive electrical contact but avoiding the application of significant lateral force against the flashcube until it is already in laterally supported engagement with the socket structure.

Various means for accomplishing the invention and other advantages thereof will be apparent from the following detailed description of a specific preferred embodiment of the invention, reference being made to the accompanying drawings in which like reference numerals denote like elements.

3

Figure 1:
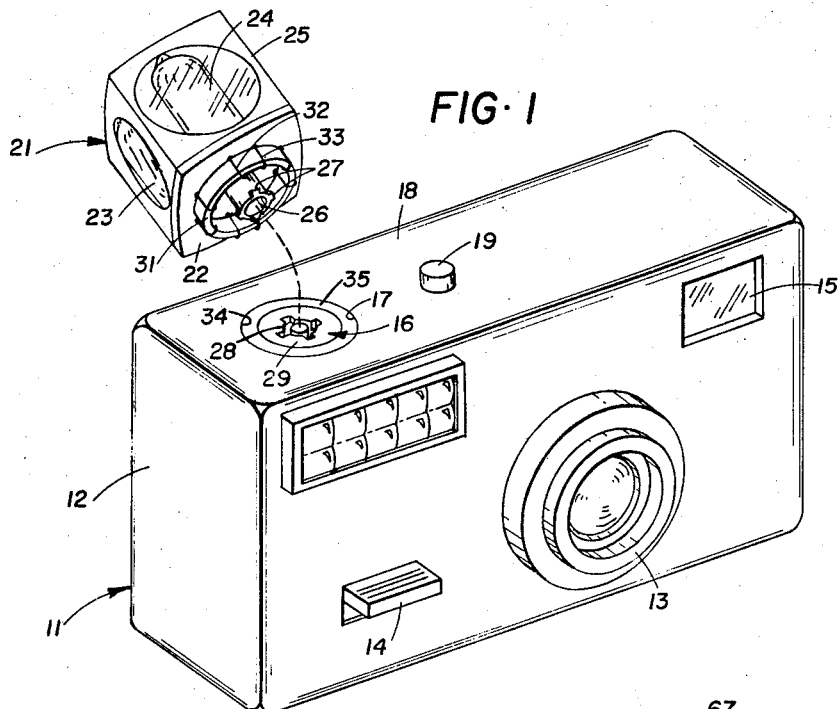
FIG. 1 is a perspective view of a camera provided with a built-in flashcube socket according to a preferred embodiment of the present invention, with a flashcube shown above the camera to illustrate the manner in which it is installed in the socket.
Figure 2:
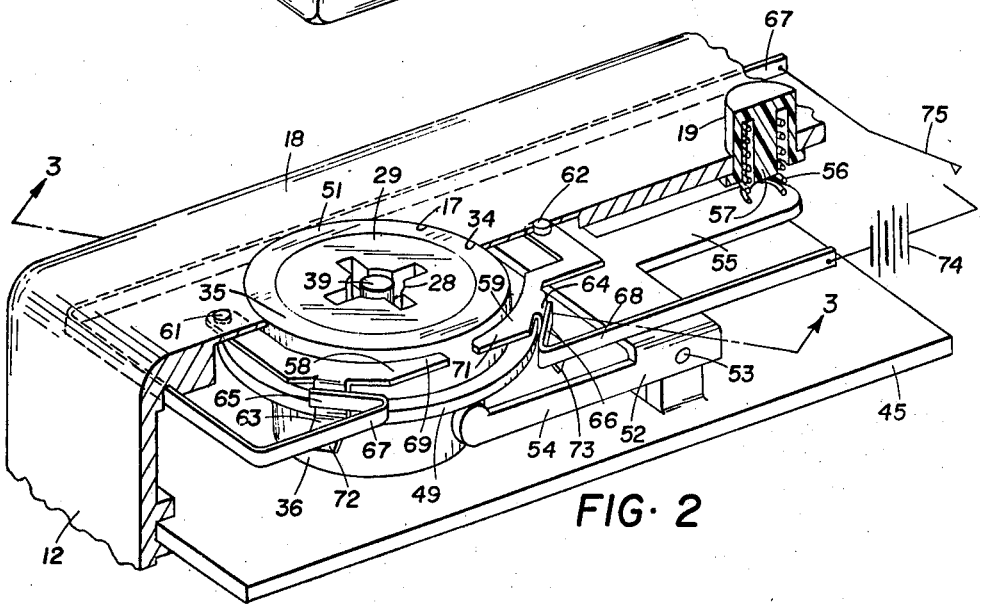
FIG. 2 is an enlarged fragmentary perspective view of the camera shown in FIG. 1 with portions of the camera shown in cross section to illustrate internal details of the flashcube socket structure.
Figure 3:
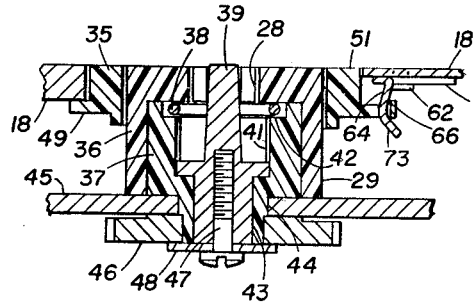
FIG. 3 is a partial cross-sectional view taken diagonally through the socket along the line 3—3 of FIG. 2, showing the relation of the depicted socket components in the absence of a flashcube therein.
Figure 4:
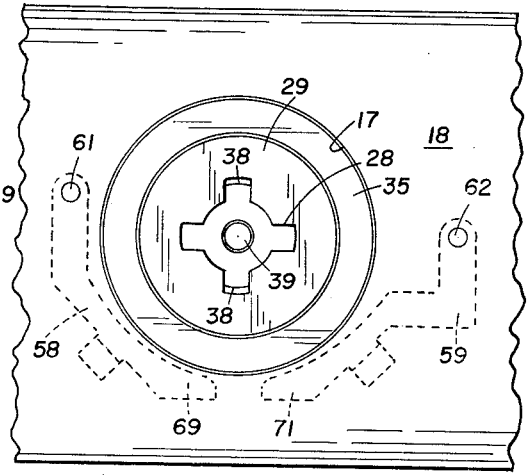
Figure 5:
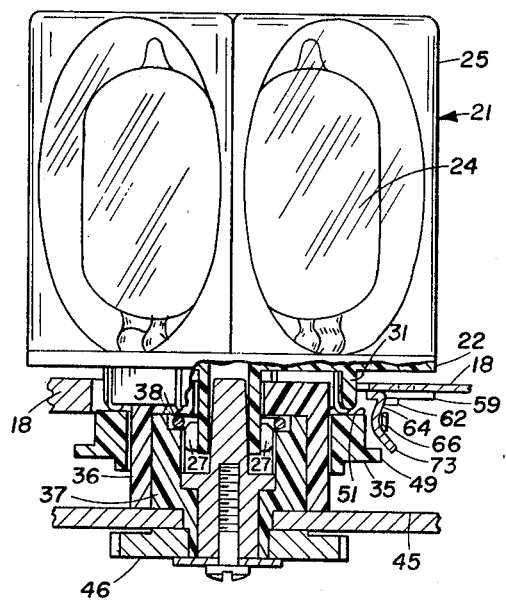

FIG. 4 is an enlarged partial top plan view of the camera illustrated in FIGS. 1 and 2, showing, in dashed lines, the positions of the respective electrical contact members when the socket components are positioned as shown in FIG. 3;

FIG. 5 corresponds to FIG. 3 and shows the positions of the various illustrated socket components when a flashcube is inserted in the socket; and.

Figure 6:
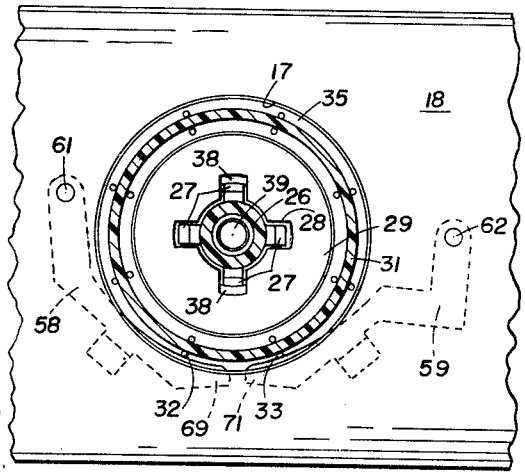

FIG. 6 corresponds to FIG. 4 to illustrate the manner in which the contact members are engaged with the contact wires of a flashcube, partially shown in cross section, when the flashcube is inserted in the socket.

DESCRIPTION OF THE PREFERRED EMBODIMENT

The camera shown in FIG. 1, designated by numeral 11, is of generally conventional design, comprising a box-like housing 12, an objective lens assembly 13, a shutter operating member 14, and a viewfinder 15. The socket construction comprising the present invention, indicated generally at 16, is mounted in an aperture 17 in the top wall member 18 of camera housing 12, adjacent to an ejector button 19.

A flashcube 21, adapted to be received in socket 16, comprises a generally square base plate 22 adapted to support four flash lamps, two of which are shown at 23 and 24, such lamps being enclosed by a transparent protective hood member 25. A tubular stud member 26 extends downwardly from the center of the base plate and is provided with four outwardly projecting spline teeth 27 adapted to be received in a mating splined hole 28 in rotatable socket member 29, to orient rotationally flashcube 21 in fixed relation to rotatable socket member 29. A tubular collar 31 surrounds stud member 26 in concentric relation thereto to support the symmetrically spaced flash lamp contact wires, which are bent over collar 31 in generally parallel relation to the axis of flashcube 21. Two of these wires are associated with each of the flash lamps, as shown by the numerals 32 and 33 that designate the two contact wires connected to lamp 24, whereby each lamp can be fired individually by passing an electric current through its two contact wires. When flashcube 21 is inserted in socket 16, collar 31 is received in an annular opening 34 between the periphery of rotatable socket member 29 and the edge of aperture 17. Except when a flashcube is installed in the socket, opening 34 is closed by a non-conductive movable ring member 35.

By reference to FIGS. 2 and 3, it will be seen that the rotatable socket member 29 comprises a cylindrical non-conductive outer member 36, a cylindrical non-conductive inner member 37, a resilient stud retention clip 38, and a central guide pin member 39, such construction being generally similar to that described in the above-identified patent. The splined hole 28 in outer member 36 is aligned with a similar splined hole 41 in inner member 37, with clip 38 positioned in recess 42 between the inner and outer members. Members 36, 37, and 39 of rotatable socket member 29 are cemented or otherwise permanently joined together. A cylindrical projection 43, extending downwardly from inner member 37, projects through a bearing hole 44 in stationary support plate 45 to support rotatably the socket member 29 in concentric relation to hole 17, with the upper surfaces of socket member 29 generally flush with the top surface of wall member 18 of camera housing 12. A gear 46 is pressed onto the lower end of projection 43 and is retained thereon by a screw 47 and washer 48 to maintain socket member 29 in supported relation with support plate 45.

Ring member 35 is slidably supported on socket member 29 for vertical movement between the raised position shown in FIGS. 1 through 4 and the depressed position shown in FIGS. 5 and 6. When the ring member 35 is in its raised position, as defined by the engagement of its annular flange 49 with adjacent portions of the top camera wall member 18, ring member 35 completely closes annular opening 34, with the top surface 51 of ring member 35 being substantially flush with the adjacent top surfaces of wall member 18 and socket member 29.

To move ring member 35 to its raised position, a bifurcated ejector lever 52 is supported for rocking movement on support plate 45 by a pivot rod 53 and includes a pair of arms, one of which is shown at 54, in engagement with the lower surface of flange 49 at opposite sides of ring member 35. At the end of lever 52 opposite the ring-engaging arms, a central arm 55 extends beneath ejector button 19, which is slidably supported in wall member 18 and urged upwardly by a light coil spring 56 engaged with the end of arm 55. By this arrangement, downward movement of ring member 35 causes spring 56 to be compressed as ejector lever 52 is rocked on pivot rod 53, but, when ejector button 19 is depressed, its central projection 57 engages arm 55 to raise ring member 35 by positively rocking ejector lever 52 in a clockwise direction, as viewed in FIG. 2.

To insert flashcube 21 in socket 16, the flashcube is axially aligned with the socket with the tip of guide pin 39 received in the lower end of tubular stud member 26, and is rotated so that spline teeth 27 can enter the correspondingly splined hole 28. As the flashcube is then pressed downwardly into the socket toward the position shown in FIG. 5, ring member 35 is depressed against the slight resistance of spring 56 by the portions of the contact wires bent over the lower edge of flashcube collar 31. During such downward movement of the flashcube, at least two opposite spline teeth 27 on stud member 26 encounter the resilient stud retention clip 38, which is cammed open by teeth 27 as they are urged past clip 38 to the position shown in FIG. 5, in which teeth 27 are trapped below resilient clip 38. When ejector button 19 is subsequently depressed, ring member 35 is urged upwardly against the contact wires on collar 31 with sufficient force to cam spline teeth 27 past resilient clip 38, thereby ejecting the flashcube from the socket and returning ring member 35 to its raised position where it remains until another flashcube is inserted in the socket.

Due to the mating relation of spline teeth 27 with splined hole 41, a flashcube inserted in the socket is positively rotatable with socket member 29, which is rotatively driven through gear 46 by a flashcube indexing mechanism, not shown, an example of such a mechanism being illustrated in the above-mentioned patent. Accordingly, each time the flashcube indexing mechanism is operated, the flashcube in the socket is rotated through 90 degrees to place a successive lamp thereof in correct position to illuminate the scene visible in the camera viewfinder.

The two electrical contact members adapted to contact corresponding wires of the flash lamp positioned to illuminate the viewed scene are shown at 58 and 59 in FIG. 2, and are pivotally anchored to recessed portions of upper wall member 18 of camera housing 12 by pivot studs 61 and 62 respectively. The two contact members 58 and 59 are provided with respective cam ears 63 and 64 engaged by the corresponding resilient end portions 65 and 66 of conductor straps 67 and 68, which urge the free ends 69 and 71 of the respective contact members toward socket member 29. When ring member 35 is in its raised position, the upper portions of cam ears 63 and 64 are engaged by flange 49 to locate contact members 58 and 59 entirely beyond annular opening 34 in laterally spaced relation to socket member 29, against the resilient influence of conductor straps 67 and 68 respectively. As ring member 35 is moved downwardly during insertion of a flashcube in the socket, however, flange 49 moves into alignment with the lower outwardly sloped portions 72 and 73 of the respective cam ears 63 and 64, thereby allowing the free ends of contact members 58 and 59 to be moved inwardly, by the relatively stiff resilient conductor straps 67 and 68, into firm engagement with the corresponding wires of the operatively positioned flash lamp, as shown in FIGS. 5 and 6. The conductor straps 67 and 68 are connected in series with a battery 74 and a normally open switch 75 operated by the camera shutter. Accordingly, when the shutter is operated, switch 75 is closed simultaneously, thereby firing the flash lamp to illuminate the scene being photographed. When the flashcube indexing mechanism is subsequently operated, the flashcube is rotated to bring the pair of wires connected to the next lamp into electrical engagement with the two contact members 58 and 59, the end portions of which are smoothly rounded or sloped to allow the contact wires to slide freely along the contact members during such rotation of the flashcube.

In connection with the above-described inward and outward movement of contact members 58 and 59, it should be noted, as best illustrated in FIGS. 3 and 5, that the upward movement of ring member 35 causes contact members 58 and 59 to retract entirely beyond annular opening 34 and out of the path of movement of ring member 35 before ring member 35 reaches a position horizontally aligned with the end portions of contact members 58 and 59; and that cam ears 63 and 64 are disengaged from flange 49 when ring member 35 is in its fully depressed position to ensure positive engagement of contact members 58 and 59 with the corresponding contact wires of the flashcube.

While the foregoing description relates to a specific embodiment of the invention comprising a socket adapted to receive a particular type of multilamp flash unit, it should be apparent that the same novel features could be embodied in other socket structures adapted to receive other types of multiple- or single-lamp flash or other illumination units. Similarly, the same inventive concepts could also be employed in a socket from which the illumination unit is removed manually rather than by means of an ejector button or the like. Thus, the invention has been described in detail with particular reference to a preferred embodiment thereof, but it will be understood that variations and modifications can be effected within the spirit and scope of the invention.

I claim:
1. In a socket for receiving removably and rotatably a flashcube, said flashcube comprising:
   (a) a base plate;
   (b) a centrally located stud member projecting from one face of said base plate;
   (c) a tubular collar projecting from said one face of said base plate in concentric surrounding relation to said stud member; and
   (d) a plurality of flash lamps mounted adjacent to the opposite face of said base plate, each of said flash lamps having a pair of spaced contact wires extending through said base plate and supported by said collar with portions of said wires extending axially along the outer periphery of said collar;
and said socket including:
   (e) a housing having an external wall member;
   (f) means defining an aperture in said wall member; and
   (g) a stud-receiving member extending into said aperture, with said aperture defining, about said stud-receiving member, an annular opening adapted to receive said collar when said flashcube is inserted in said socket with said stud member received in said stud-receiving member;
the improvement comprising:
   (h) a pair of contact members supported in said housing for movement between
      (1) operative positions, in which said contact members are engageable by the contact wires of a flash lamp of said flashcube when said collar of said flashcube is received in said opening and oriented to a predetermined rotational position, and
      (2) inoperative positions, in which said contact members are not engageable by said contact wires supported by said collar received in said opening; and
   (i) means for moving said contact members
      (1) to their respective operative positions in response to movement of said collar into said annular opening during insertion of said flashcube in said socket, and
      (2) to their respective inoperative positions in response to movement of said collar out of said annular opening during removal of said flashcube from said socket.

2. The improved flashcube socket claimed in claim 1 in which said contact members are supported laterally of said annular opening, extend inwardly within said annular opening when in said operative positions, and are retracted outwardly beyond said annular opening when in said inoperative positions.

3. The improved flashcube socket claimed in claim 2 including:
   (a) a movable ring member surrounding said stud-receiving member, said ring member being movable between a first position and a second position;
   (b) a generally flat surface defined by said ring member and engageable by said wires supported by said collar to move said ring member from said first position to said second position as said flashcube is inserted in said socket;
   (c) means for moving said ring member from said second position to said first position when said flashcube is removed from said socket;
   (d) resilient means biasing said contact members toward their respective operative positions; and
   (e) cam means operatively connecting said ring member and said contact members to move said contact members to their respective inoperative positions, against the influence of said resilient means, in response to movement of said ring member toward said first position.

4. The improved flashcube socket claimed in claim 3 in which said annular opening is closed by said ring member, and said flat surface of said ring member is generally flush with the exterior surface of said housing wall member surrounding said aperture, when said ring member is in said first position.

5. The improved flashcube socket claimed in claim 3 in which said ring member is movable from said second position to said first position by manually operatable flashcube ejector means.

References Cited

UNITED STATES PATENTS

| | | | |
|---|---|---|---|
| 936,705 | 10/1909 | Conlan | 339—42 |
| 2,468,846 | 5/1949 | Trainor | 339—45 |
| 3,312,086 | 4/1967 | Casebeer, et al. | 67—31 |
| 3,319,548 | 5/1967 | Kottler | 95—11 |
| 3,335,651 | 8/1967 | Williams et al. | 95—11 |
| 3,353,468 | 11/1967 | Beach | 95—11.5 |
| 1,225,526 | 5/1917 | Thomas | 339—42 XR |
| 2,986,612 | 5/1961 | Healy | 200—51 |

MARVIN A. CHAMPION, Primary Examiner

P. A. CLIFFORD, Assistant Examiner

U.S. Cl. X.R.

339—45; 95—11.5